United States Patent
Wang et al.

(10) Patent No.: US 10,858,588 B2
(45) Date of Patent: Dec. 8, 2020

(54) LIQUID CRYSTAL COMPOSITION AND LIQUID CRYSTAL DISPLAY ELEMENT OR DISPLAY THEREOF

(71) Applicant: Shijiazhuang Chengzhi Yonghua Display Material Co., Ltd, Shijiazhuang (CN)

(72) Inventors: Mingxia Wang, Shijiazhuang (CN); Xing Zhang, Shijiazhuang (CN); Huifang Wang, Shijiazhuang (CN); Guofang Wang, Shijiazhuang (CN); Jianming Cheng, Shijiazhuang (CN); Zhe Shao, Shijiazhuang (CN); Guoliang Yun, Shijiazhuang (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 0 days.

(21) Appl. No.: 16/126,667

(22) Filed: Sep. 10, 2018

(65) Prior Publication Data
US 2019/0078021 A1    Mar. 14, 2019

(30) Foreign Application Priority Data
Sep. 12, 2017    (CN) .......................... 2017 1 0816855

(51) Int. Cl.
| | |
|---|---|
| G02F 1/1333 | (2006.01) |
| C09K 19/34 | (2006.01) |
| G02F 1/137 | (2006.01) |
| G02F 1/1368 | (2006.01) |
| C09K 19/30 | (2006.01) |
| C09K 19/12 | (2006.01) |

(52) U.S. Cl.
CPC .......... *C09K 19/3491* (2013.01); *G02F 1/137* (2013.01); *C09K 2019/123* (2013.01); *C09K 2019/301* (2013.01); *C09K 2019/3004* (2013.01); *C09K 2019/3016* (2013.01); *C09K 2019/3027* (2013.01); *G02F 1/1368* (2013.01); *G02F 2001/13712* (2013.01)

(58) Field of Classification Search
CPC ... C09K 19/3491; G02F 1/137; G02F 1/1333; G02F 1/1368; G02F 2001/13712
USPC .................................................... 252/299.61
See application file for complete search history.

(56) References Cited

U.S. PATENT DOCUMENTS

| | | | | |
|---|---|---|---|---|
| 2016/0298034 | A1* | 10/2016 | Lietzau | C09K 19/3491 |
| 2016/0319194 | A1* | 11/2016 | Hirschmann | C09K 19/3098 |

\* cited by examiner

*Primary Examiner* — Geraldina Visconti
(74) *Attorney, Agent, or Firm* — Muncy, Geissler, Olds & Lowe, P.C.

(57) ABSTRACT

The present invention discloses a negative dielectric anisotropic liquid crystal composition, characterized in that the liquid crystal composition comprises one or more compounds represented by formula I, one or more compounds represented by formula II, one or more compounds represented by formula III and one or more compounds represented by formula IV,

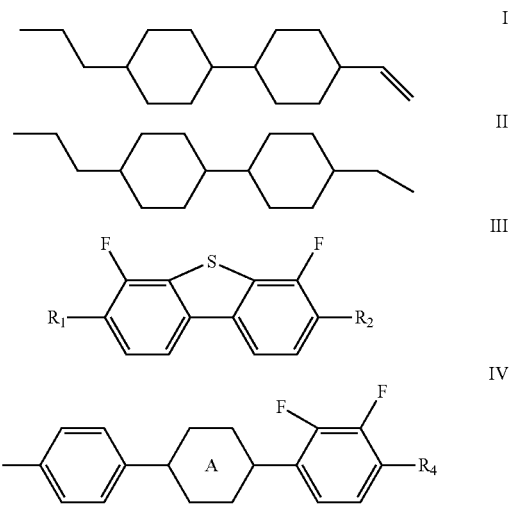

In the liquid crystal molecules of the composition, the van der Waals force therebetween is used as a motive force, such that the liquid crystal molecules generate an attractive force at an appropriate distance and positional relationships, thereby enabling the liquid crystal molecules to have excellent regular alignment characteristics, which is favorable for the liquid crystal molecules to modulate the transmission and blocking of light in the liquid crystal display device.

10 Claims, No Drawings

LIQUID CRYSTAL COMPOSITION AND LIQUID CRYSTAL DISPLAY ELEMENT OR DISPLAY THEREOF

TECHNICAL FIELD

The present invention belongs to the field of liquid crystal display, and specifically relates to a liquid crystal composition and a liquid crystal display element or a liquid crystal display comprising the liquid crystal composition.

BACKGROUND ART

Thin film transistor liquid crystal display (TFT-LCD) has undergone a long period of basic research. After achieving mass production and commercialization, it has become a mainstream product in LCD applications due to its advantages of a light weight, being environmentally friendly, high performance, etc.: it can be seen that TFT-LCDs can be used everywhere whether in small-sized mobile phone screens, or large-sized notebooks (Notebook PCs) or monitors (Monitors), and large-scale liquid crystal display televisions (LCD-TV).

In the early commercialized TFT-LCD products the TN display mode is substantially used, and the largest problem is the narrow viewing angle. With the increase of the product size, especially the applications in the field of TVs, the IPS display mode and VA display mode with the characteristic of a wide viewing angle have been developed and applied successively; in particular, the improvements based on the VA display mode have been successively achieved a breakthrough development in major companies respectively, which mainly depends on the advantages of a wide viewing angle, a high contrast ratio and no rubbing alignment, etc., of the VA mode itself; additionally, the contrast ratio of the VA mode display is less dependent on the optical anisotropy ($\Delta n$) of the liquid crystal, the thickness (d) of the liquid crystal cell, and the wavelength ($\lambda$) of the incident light, which will certainly make the VA mode a promising display technology.

However, the liquid crystal medium used for display elements of an active matrix addressing mode such as the VA mode in itself is not perfect and has disadvantages, for example, an image sticking level which is significantly inferior to that of a positive dielectric anisotropic display element, a slower response time, a higher driving voltage, etc. At this time, some new-type VA display technologies emerge quietly: for example, the PSVA technology not only realizes a wide viewing angle display mode similar to MVA/PVA, but also simplifies the CF process, thereby reducing the CF cost while improving the aperture ratio, and obtaining a higher luminance, thereby achieving a higher contrast ratio. Additionally, although the entire liquid crystal has a pretilt angle and no domino delay, and a faster response time can be obtained while maintaining the same driving voltage without affecting the image sticking level, since the electrodes are densely distributed in the Fine Slit in the pixels, if the electrode widths are not uniformly distributed, problems with uneven display may easily occur. Like UVVA technology, on the basis of maintaining the advantages of PSVA technology, since there is no Slit structure on the TFT side, the problem in terms of the occurrence of uneven display caused by uneven pixel electrode widths, is also improved. Although the display devices are constantly developed, people have been working on the study of new liquid crystal compounds, such that the liquid crystal medium and the performance thereof in terms of applications to display are constantly developed forward.

SUMMARY OF THE INVENTION

The present invention provides a negative dielectric anisotropic liquid crystal composition, and a liquid crystal display element or a liquid crystal display comprising the liquid crystal composition. In the liquid crystal molecules of the composition, the van der Waals force therebetween is used as a motive force, such that the liquid crystal molecules generate an attractive force at an appropriate distance and positional relationships, thereby enabling the liquid crystal molecules to have excellent regular alignment characteristics, which is favorable for the liquid crystal molecules to modulate the transmission and blocking of light in the liquid crystal display device.

The present invention provides a negative dielectric anisotropic liquid crystal composition comprising one or more compounds represented by formula I, one or more compounds represented by formula II, one or more compounds represented by formula III and one or more compounds represented by formula IV,

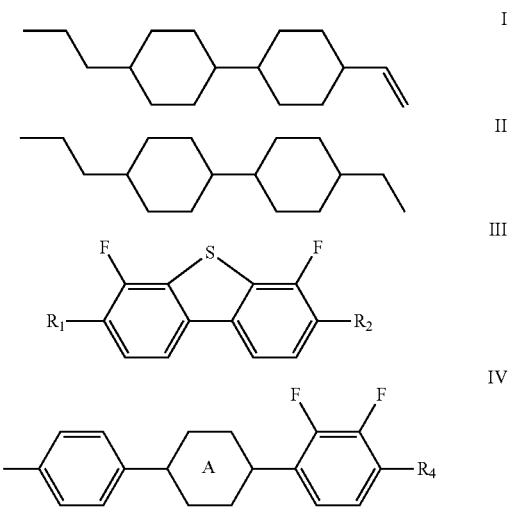

wherein $R_1$, $R_3$ each independently represents a linear alkyl group having a carbon atom number of 1-5, a linear alkoxy group having a carbon atom number of 1-5, an alkenyl group having a carbon atom number of 2-5,

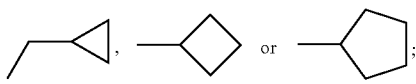

$R_2$, $R_4$ each independently represents a linear alkyl group having a carbon atom number of 1-5, a linear alkoxy group having a carbon atom number of 1-5, an alkenyl group having a carbon atom number of 2-5, F, $CF_3$ or $OCF_3$;

represents

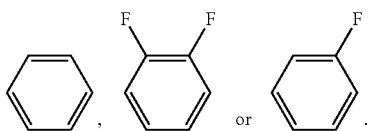

In the liquid crystal composition, the total mass content of the one or more compounds represented by formula I is preferably 1-50%, particularly preferably 30-50%; the total mass content of the one or more compounds represented by formula II is preferably 1-20%, further preferably 5-20%, particularly preferably 10-18%; the total mass content of the one or more compounds represented by formula III is preferably 1-20%, further preferably 2-12%, particularly preferably 3-10%; the total mass content of the one or more compounds represented by formula IV is preferably 1-25%, further preferably 2-20%, particularly preferably 2-15%.

The one or more compounds represented by formula III are preferably one or more of the compounds represented by formulas III1-III27, and the one or more compounds represented by formula IV are preferably one or more of the compounds represented by formulas IV1-IV4, III1
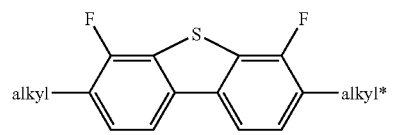

III2
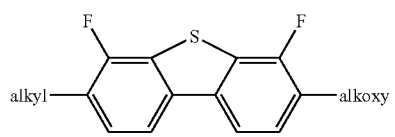

III3
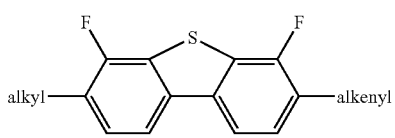

III4
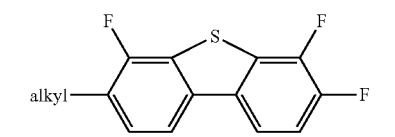

III5
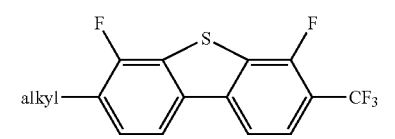

III6
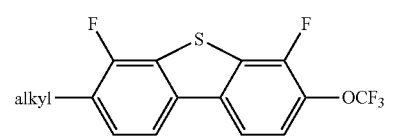

III7
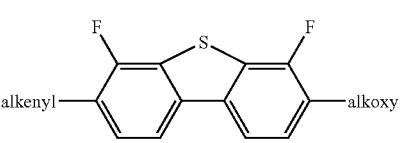

III8
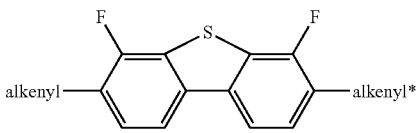

III9
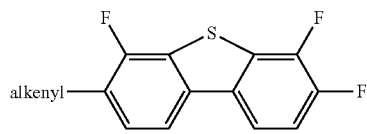

III10
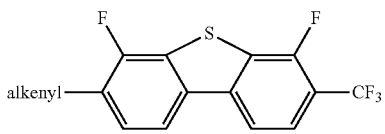

III11
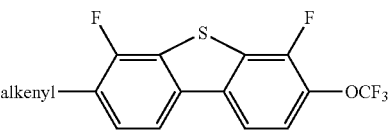

III12
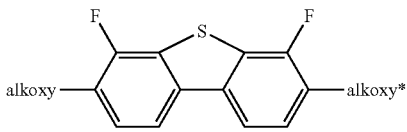

III13
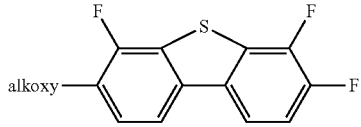

III14
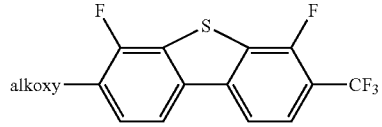

III15
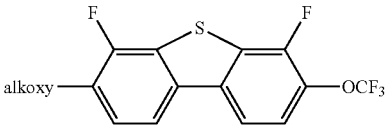

III16
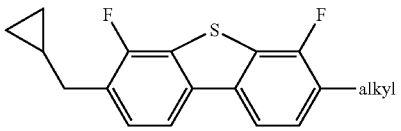

III17
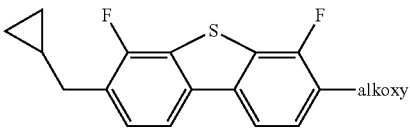

III18
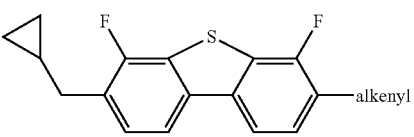

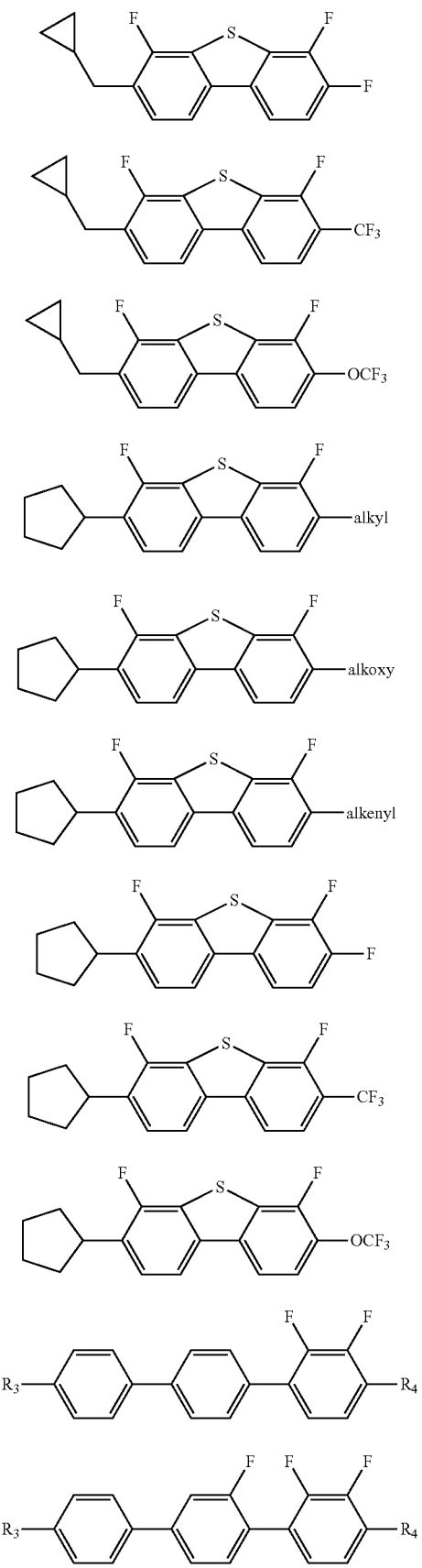

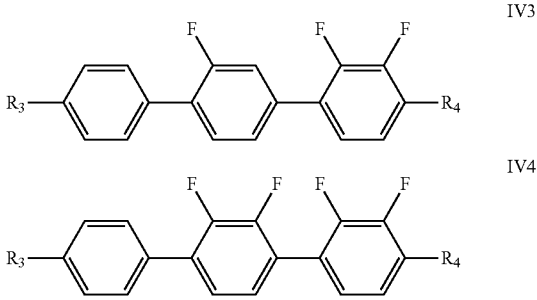

wherein alkyl, alkyl* each independently represents a linear alkyl group having a carbon atom number of 1-5;

alkoxy, alkoxy* each independently represents a linear alkoxy group having a carbon atom number of 1-5;

alkenyl, alkenyl* each independently represents an alkenyl group having a carbon atom number of 2-5;

$R_3$ each independently represents a linear alkyl group having a carbon atom number of 1-5, a linear alkoxy group having a carbon atom number of 1-5, an alkenyl group having a carbon atom number of 2-5,

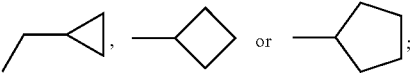

$R_4$ each independently represents a linear alkyl group having a carbon atom number of 1-5, a linear alkoxy group having a carbon atom number of 1-5 or an alkenyl group having a carbon atom number of 2-5.

One or more compounds represented by formula III are further preferably one or two of the following compounds, particularly preferably two of the following compounds,

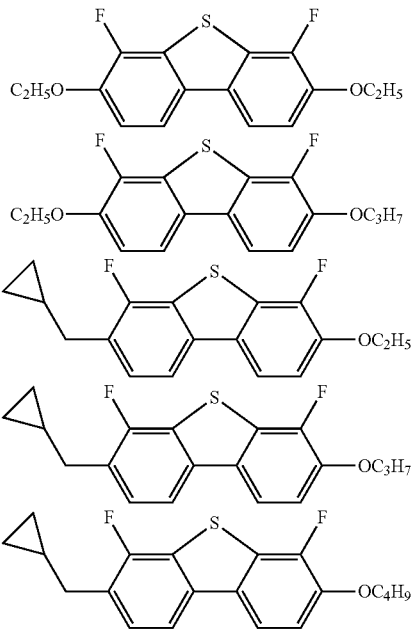

-continued

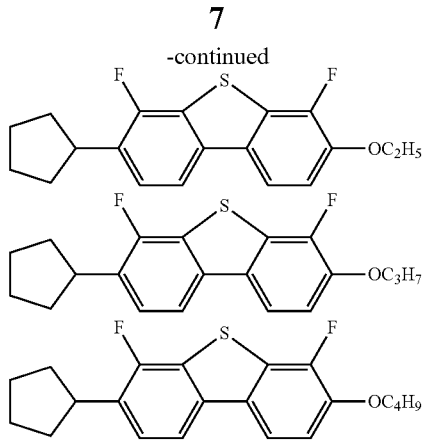

The liquid crystal composition may further comprise at least two compounds selected from formulas VA, VB and VC,

VA

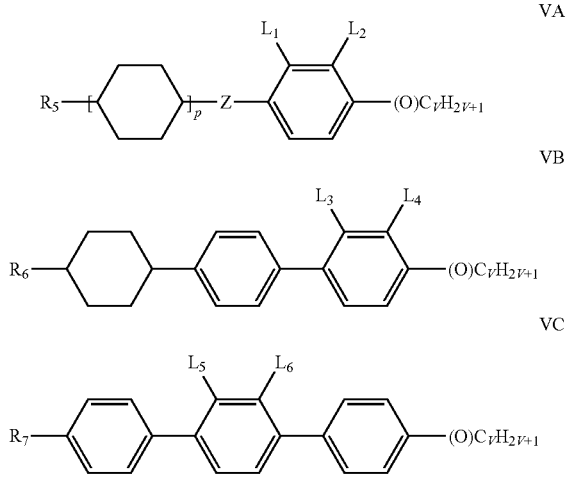

wherein $R_5$, $R_6$, $R_7$ each independently represents a linear alkyl group having a carbon atom number of 1-5, a linear alkoxy group having a carbon atom number of 1-5 or an alkenyl group having a carbon atom number of 2-5;

$L_1$-$L_6$ each independently represents H or F;

p represents 1 or 2;

v each independently represents an integer of 1-6;

Z represents a single bond, —CH$_2$CH$_2$—, —CH$_2$O—, —OCH$_2$—.

In such a case, it comprises two, three, four, five or six compounds represented by formulas VA, VB, VC. Preferably, it comprises two or three compounds represented by formula VA, in particular compounds represented by formulas VA1-VA6; further preferably, it comprises two compounds represented by formula VA, in particular compounds represented by formulas VA1, VA2, VA4, VA6; preferably, it comprises two or three compounds of the VB, in particular compounds of VB1 and VB2.

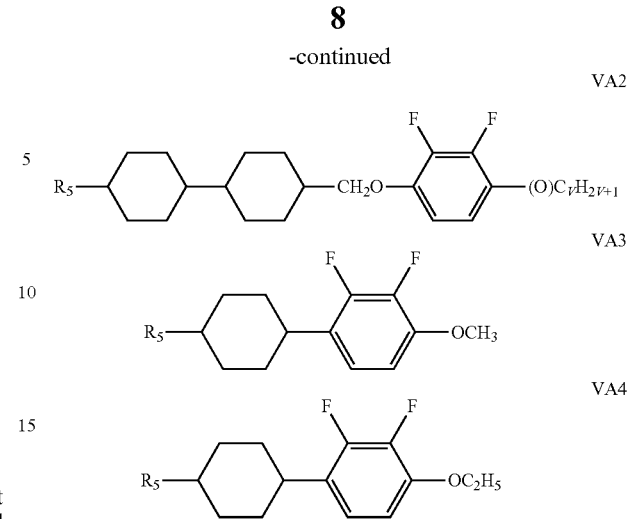

wherein the proportion of the compounds represented by formulas VA and/or VB and/or VC in the entire mixture is preferably at least 10% by weight.

The liquid crystal medium provided in the present invention further preferably comprises at least one polymerizable compound. The polymerizable compound may be a compound represented by RM1-RM6,

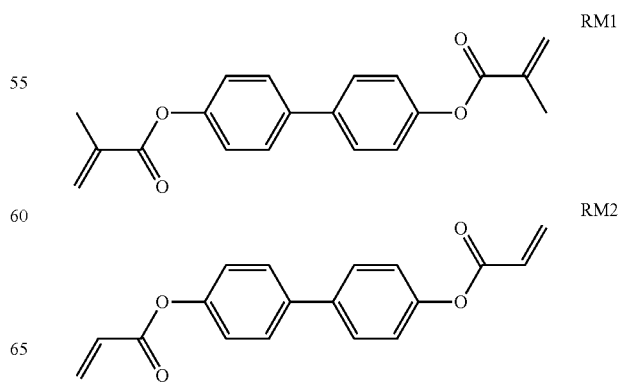

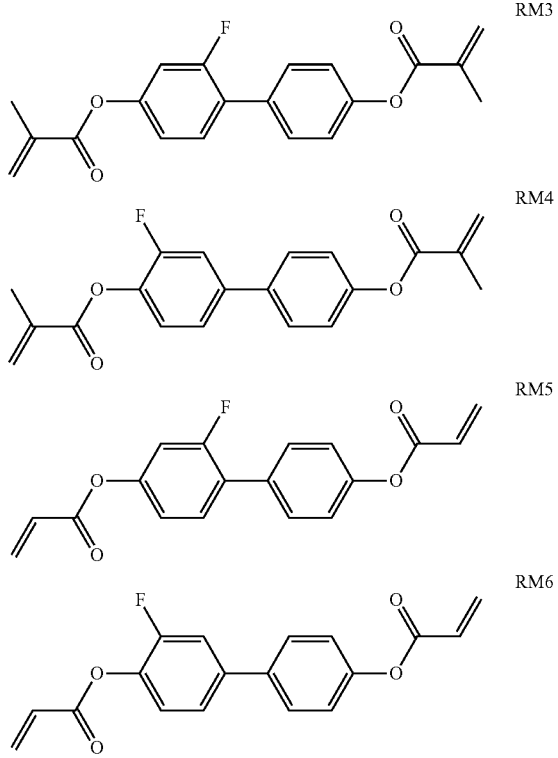

RM3

RM4

RM5

RM6

The liquid crystal medium provided in the present invention further preferably comprises at least one additive. The additive may be compounds represented by formulas VI1-VI6.

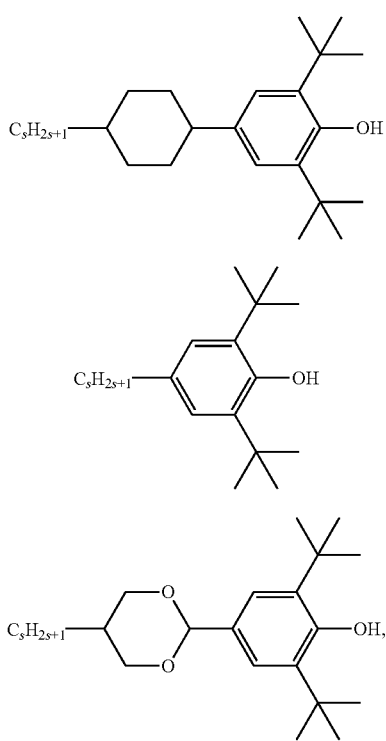

VI1

VI2

VI3

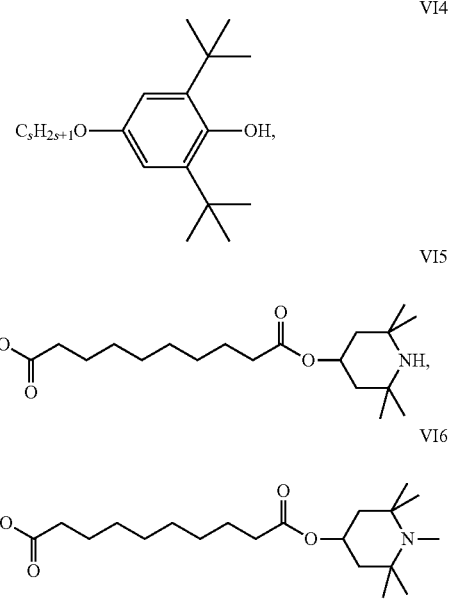

VI4

VI5

VI6

S is selected from an integer of 1-10.

The liquid crystal composition provided in the present invention may further comprise one or more compounds of the following formula

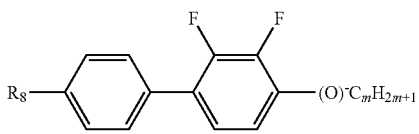

the content is preferably >3%, particularly >5%;

$R_8$ has the same meaning as $R_5$; and m represents an integer of 1-6.

The liquid crystal composition of the present invention is suitable for use in all displays of a VA, PSA, PA-VA, SS-VA, SA-VA, PS-VA, PALC, IPS, PS-IPS, FFS or PS-FFS effect.

DETAILED DESCRIPTION OF EMBODIMENTS

The present invention is further described in detail by combining the following specific examples, but the present invention is not limited to the following examples. The methods are all conventional methods unless otherwise specified. The raw materials can be obtained from public commercial routes unless otherwise specified. The percentages are all percentages by mass unless otherwise specified.

In the following examples,

CP represents a clearing point and is directly measured using a WRX-1S microscopic thermal analyzer, and the heating rate is set to 3° C./min.

Δn represents an optical anisotropy (589 nm, 20° C.),

Δε represents a dielectric anisotropy (25° C., 1 KHz, HP4284A, a 5.2 microns TN left-hand cell), γ1 represents a rotary viscosity (mpas) at 20° C., VHR (%) represents a charge holding ratio (5 V, 60 Hz, 20° C.), and ρ (×1013 Ω·cm) represents a resistivity (20° C.), k33 represents a bend elastic constant τ represents a response time: ton+toff ton is the turn-on time when 90% of the maximum contrast is reached toff is the turn-off time when 10% of the maximum contrast is reached The testers of the voltage holding ratio VHR (%) and the resistivity ρ (×10 13 Ω·cm) are both TOY006254 and TOY06517 types liquid crystal physical property evaluation systems (a test temperature of 20° C., a time of 16 ms, the test cell is of 7.0 microns).

The smaller the γ1/k33, the easier, the modulation of the transmission and blocking of light.

Furthermore, the structures of the liquid crystal monomers in the examples of the present invention are represented by codes, and the code representation methods for the liquid crystal ring structures, the end groups and the linking groups are shown in the following table (I) and Table (II).

TABLE (I)

Corresponding codes of ring structures

| Ring structures | Corresponding codes |
|---|---|
| 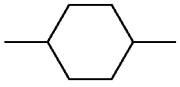 | C |
| 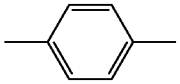 | P |
| 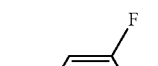 | G |
| 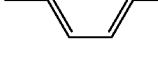 | U |
| 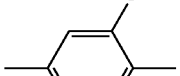 | GI |
| 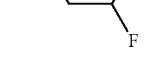 | Y |
| 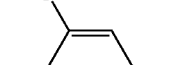 | A |
| 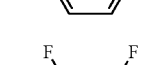 | D |
| 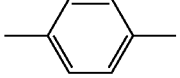 | B |

TABLE (I)-continued

Corresponding codes of ring structures

| Ring structures | Corresponding codes |
|---|---|
| 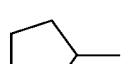 | B(S) |

TABLE (II)

Corresponding codes of end groups and linking groups

| End groups and linking groups | Corresponding codes |
|---|---|
| $C_nH_{2n+1}$— | n- |
| $CnH2_{n+1}O$— | nO— |
| —$OCF_3$ | OT |
| —$CF_3$ | -T |
| —$CF_2O$— | Q |
| —F | —F |
| —CN | —N |
| —CH2CH2— | E |
| —CH=CH— | V |
| —C≡C— | T |
| —COO— | Z |
| —CH=CH—CnH2n + 1 | —Vn |
| 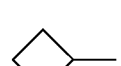 | C(5) |
|  | C(4) |
| 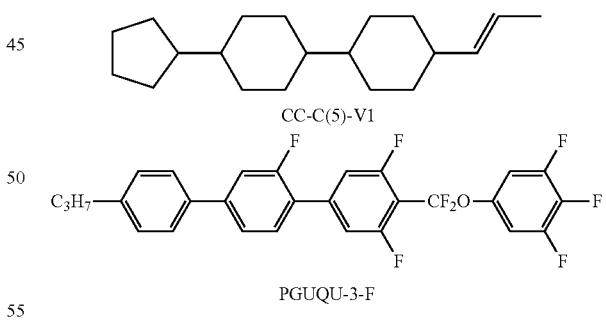 | C(3)1 |

For example:

CC-C(5)-V1

PGUQU-3-F

The following tables are formulations and basic optical parameters of the comparative liquid crystal and six liquid crystal compositions:

Comparative Liquid Crystal Composition 1:

| Category | Liquid crystal monomer code | Content (%) |
|---|---|---|
| I | CC-3-V | 50 |
| II | CC-3-V1 | 10 |

-continued

| Category | Liquid crystal monomer code | Content (%) |
|---|---|---|
| III | B(S)-C(5)-O4 | 10 |
| III | B(S)-2O-O4 | 10 |
| IV | PPY-3-O2 | 10 |
| IV | PGIY-5-O2 | 10 |

Δn[589 nm, 20° C.]: 0.1092
Cp[° C.]: 76
k33: 11
Δε[1 KHz, 20° C.]: −3.2
$\gamma_1$[mPa · s, 20° C.]: 70
$\gamma_1$/k33: 6.4

Comparative Liquid Crystal Composition 2:

| Category | Liquid crystal monomer code | Content (%) |
|---|---|---|
| I | CC-3-V | 60 |
| III | B(S)-2O-O4 | 10 |
| III | B(S)-C(5)-O4 | 10 |
| IV | PPY-3-O2 | 10 |
| IV | PGIY-5-O2 | 10 |

Δn[589 nm, 20° C.]: 0.107
Cp[° C.]: 72
k33: 11
Δε[1 KHz, 20° C.]: −3.1
$\gamma_1$[mPa · s, 20° C.]: 70
$\gamma_1$/k33: 6.4

Comparative Liquid Crystal Composition 3:

| Category | Liquid crystal monomer code | Content (%) |
|---|---|---|
| I | CC-3-V | 50 |
| II | CC-2-3 | 10 |
|  | B-2O-O4 | 20 |
| IV | PPY-3-O2 | 10 |
| IV | PGIY-5-O2 | 10 |

Δn[589 nm, 20° C.]: 0.105
Cp[° C.]: 73
k33: 9.8
Δε[1 KHz, 20° C.]: −3.2
$\gamma_1$[mPa · s, 20° C.]: 61
$\gamma_1$/k33: 6.2

Comparative Liquid Crystal Composition 4:

| Category | Liquid crystal monomer code | Content (%) |
|---|---|---|
| I | CC-3-V | 50 |
| II | CC-2-3 | 10 |
| III | B(S)-2O-O4 | 10 |
| III | B(S)-C(5)-O4 | 10 |
|  | CPY-3-O2 | 20 |

Δn[589 nm, 20° C.]: 0.09
Cp[° C.]: 69
k33: 11
Δε[1 KHz, 20° C.]: −3.4
$\gamma_1$[mPa · s, 20° C.]: 71
$\gamma_1$/k33: 6.5

Comparative Liquid Crystal Composition 5:

| Category | Liquid crystal monomer code | Content (%) |
|---|---|---|
| I | CC-3-V | 50 |
| II | CC-2-3 | 10 |
| III | B(S)-2O-O4 | 10 |
| III | B(S)-C(5)-O4 | 10 |
| IV | PY-5-O2 | 20 |

Δn[589 nm, 20° C.]: 0.08
Cp[° C.]: 69
k33: 5.5
Δε[1 KHz, 20° C.]: −3.3
$\gamma_1$[mPa · s, 20° C.]: 50
$\gamma_1$/k33: 9.1

Liquid Crystal Composition 1

| Category | Liquid crystal monomer code | Content (%) |
|---|---|---|
| I | CC-3-V | 50 |
| II | CC-2-3 | 10 |
| III | B(S)-2O-O4 | 10 |
| III | B(S)-C(5)-O4 | 10 |
| IV | PPY-3-O2 | 10 |
| IV | PGIY-5-O2 | 10 |

Δn[589 nm, 20° C.]: 0.105
Cp[° C.]: 73
k33: 11
Δε[1 KHz, 20° C.]: −3.2
$\gamma_1$[mPa · s, 20° C.]: 61
$\gamma_1$/k33: 5.5

Liquid Crystal Composition 2

| Category | Liquid crystal monomer code | Content (%) |
|---|---|---|
| I | CC-3-V | 50 |
| II | CC-2-3 | 10 |
| III | B(S)-C(5)-O4 | 20 |
| IV | PPY-C(5)-O2 | 10 |
| IV | PGIY-C(5)-O2 | 10 |

Δn[589 nm, 20° C.]: 0.105
Cp[° C.]: 76
k33: 15
Δε[1 KHz, 20° C.]: −3.2
$\gamma_1$[mPa · s, 20° C.]: 61
$\gamma_1$/k33: 4.1

Liquid Crystal Composition 3

| Category | Liquid crystal monomer code | Content (%) |
|---|---|---|
| I | CC-3-V | 40 |
| II | CC-2-3 | 5 |
| III | B(S)-2O-O3 | 5 |
| III | B(S)-2O-O2 | 2 |
| III | B(S)-C(5)-O2 | 3 |
| IV | PYY-3-O2 | 15 |
| VA | COY-3-O2 | 15 |
| VA | CY-3-O2 | 15 |

Δn[589 nm, 20° C.]: 0.09
Cp[° C.]: 69
k33: 9.2
Δε[1 KHz, 20° C.]: −3.9
$\gamma_1$[mPa · s, 20° C.]: 53
$\gamma_1$/k33: 5.7

Liquid Crystal Composition 4 Comprising Two Compounds Represented by Formula III

| Category | Liquid crystal monomer code | Content (%) |
|---|---|---|
| I | CC-3-V | 40 |
| II | CC-2-3 | 5 |
| III | B(S)-2O-O3 | 5 |
| III | B(S)-C(5)-O2 | 5 |
| IV | PYY-3-O2 | 15 |
| VA | COY-3-O2 | 15 |
| VA | CY-3-O2 | 15 |

$\Delta n[589 \text{ nm}, 20°\text{C.}]$: 0.09
$Cp[°\text{C.}]$: 70
$k33$: 10
$\Delta\varepsilon[1 \text{ KHz}, 20°\text{C.}]$: −3.9
$\gamma_1[\text{mPa}\cdot\text{s}, 20°\text{C.}]$: 52
$\gamma_1/k33$: 5.2

Liquid Crystal Composition 5

| Category | Liquid crystal monomer code | Content (%) |
|---|---|---|
| I | CC-3-V | 30 |
| II | CC-2-3 | 15 |
| III | B(S)-2O-O4 | 5 |
| IV | PGIY-3-O2 | 10 |
| VA | COY-3-O2 | 10 |
| VA | CY-3-O2 | 5 |
| VA | CCY-3-O1 | 5 |
| VB | CPY-3-O2 | 10 |
| VB | CPY-5-O2 | 10 |

$\Delta n[589 \text{ nm}, 20°\text{C.}]$: 0.1027
$Cp[°\text{C.}]$: 86
$k33$: 15
$\Delta\varepsilon[1 \text{ KHz}, 20°\text{C.}]$: −3.7
$\gamma_1[\text{mPa}\cdot\text{s}, 20°\text{C.}]$: 80
$\gamma_1/k33$: 5.3

Liquid Crystal Composition 6

| Category | Liquid crystal monomer code | Content (%) |
|---|---|---|
| I | CC-3-V | 30 |
| II | CC-2-3 | 15 |
| III | B(S)-2O-O4 | 5 |
| IV | PGIY-3-O2 | 10 |
| VA | COY-3-O2 | 10 |
| VA | CCOY-3-O2 | 10 |
| VB | CPY-3-O2 | 10 |
| VB | CPY-5-O2 | 10 |

$\Delta n[589 \text{ nm}, 20°\text{C.}]$: 0.1043
$Cp[°\text{C.}]$: 88
$k33$: 16
$\Delta\varepsilon[1 \text{ KHz}, 20°\text{C.}]$: −4.0
$\gamma_1[\text{mPa}\cdot\text{s}, 20°\text{C.}]$: 80
$\gamma_1/k33$: 5.0

Liquid Crystal Composition 7

| Category | Liquid crystal monomer code | Content (%) |
|---|---|---|
| I | CC-3-V | 30 |
| II | CC-2-3 | 15 |
| III | B(S)-2O-O4 | 5 |
| IV | PGIY-3-O2 | 10 |
| VA | COY-3-O2 | 10 |
| VA | CCOY-3-O2 | 10 |
| VB | CPY-3-O2 | 20 |

$\Delta n[589 \text{ nm}, 20°\text{C.}]$: 0.1043
$Cp[°\text{C.}]$: 88
$k33$: 16
$\Delta\varepsilon[1 \text{ KHz}, 20°\text{C.}]$: −4.0
$\gamma_1[\text{mPa}\cdot\text{s}, 20°\text{C.}]$: 90
$\gamma_1/k33$: 5.6

Liquid Crystal Composition 8

| Category | Liquid crystal monomer code | Content (%) |
|---|---|---|
| I | CC-3-V | 20 |
| II | CC-2-3 | 18 |
| III | B(S)-2O-O6 | 12 |
| IV | PGIY-3-O2 | 5 |
| VA | CY-3-O2 | 10 |
| VA | CCY-3-O2 | 10 |
| VB | CPY-3-O2 | 10 |
| VB | CPY-5-O2 | 10 |
| VC | PYP-3-O2 | 5 |

$\Delta n[589 \text{ nm}, 20°\text{C.}]$: 0.1117
$Cp[°\text{C.}]$: 78
$k33$: 14
$\Delta\varepsilon[1 \text{ KHz}, 20°\text{C.}]$: −4.2
$\gamma_1[\text{mPa}\cdot\text{s}, 20°\text{C.}]$: 85
$\gamma_1/k33$: 6

Liquid Crystal Composition 9

| Category | Liquid crystal monomer code | Content (%) |
|---|---|---|
| I | CC-3-V | 10 |
| II | CC-2-3 | 20 |
| III | B(S)-C(5)-O2 | 3 |
| IV | PGIY-3-O2 | 2 |
| VA | CY-3-O2 | 15 |
| VA | CCY-3-O2 | 15 |
| VB | CPY-3-O2 | 15 |
| VB | CPY-5-O2 | 10 |
| VC | PYP-3-O2 | 10 |

$\Delta n[589 \text{ nm}, 20°\text{C.}]$: 0.1175
$Cp[°\text{C.}]$: 88
$k33$: 17
$\Delta\varepsilon[1 \text{ KHz}, 20°\text{C.}]$: −4.1
$\gamma_1[\text{mPa}\cdot\text{s}, 20°\text{C.}]$: 100
$\gamma_1/k33$: 5.9

Liquid Crystal Composition 10

| Category | Liquid crystal monomer code | Content (%) |
|---|---|---|
| I | CC-3-V | 40 |
| II | CC-2-3 | 15 |
| III | B(S)-C(5)-O2 | 7 |
| IV | PGIY-3-O2 | 3 |
| VA | CY-5-O2 | 5 |
| VA | CCY-5-O2 | 5 |
| VB | CPY-3-O2 | 7 |
| VB | CPY-5-O2 | 3 |

| Category | Liquid crystal monomer code | Content (%) |
|---|---|---|
| VC | PYP-3-O2 | 10 |
|  | PY-5-O2 | 5 |

Δn[589 nm, 20° C.]: 0.0968
Cp[° C.]: 70
k33: 12
Δε[1 KHz, 20° C.]: −3.0
γ$_1$[mPa · s, 20° C.]: 61
γ$_1$/k33: 5.1

The invention claimed is:

1. A negative dielectric anisotropic liquid crystal composition, wherein the liquid crystal composition comprises one or more compounds represented by formula I, one or more compounds represented by formula II, one or more compounds represented by formula III and one or more compounds represented by formula IV,

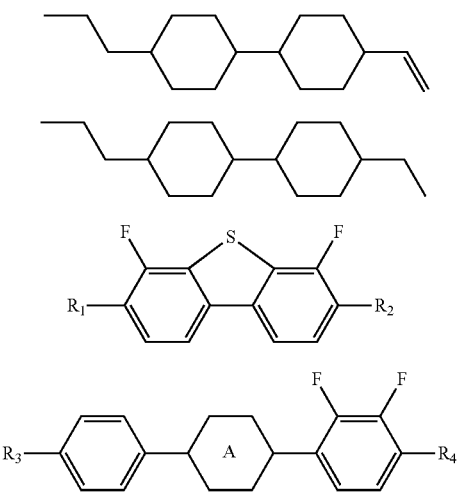

wherein R$_1$ represents

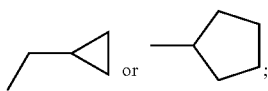

R$_3$ represents a linear alkyl group having a carbon atom number of 1-5, a linear alkoxy group having a carbon atom number of 1-5, an alkenyl group having a carbon atom number of 2-5,

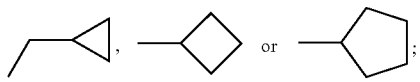

R$_2$, R$_4$ each independently represents a linear alkyl group having a carbon atom number of 1-5, a linear alkoxy group having a carbon atom number of 1-5, an alkenyl group having a carbon atom number of 2-5, F, CF$_3$ or OCF$_3$;

represents

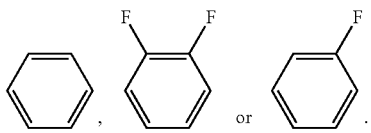

2. The liquid crystal composition according to claim 1, wherein said liquid crystal composition, the total mass content of the one or more compounds represented by formula I is 1-50%, the total mass content of the one or more compounds represented by formula II is 1-20%, the total mass content of the one or more compounds represented by formula III is 1-20%, and the total mass content of the one or more compounds represented by formula IV is 1-25%.

3. The liquid crystal composition according to claim 1, wherein the one or more compounds represented by formula III are one or more of the compounds represented by formulas III16-III27, and the one or more compounds represented by formula IV are one or more of the compounds represented by formulas IV1-IV4,

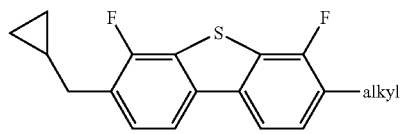
III16

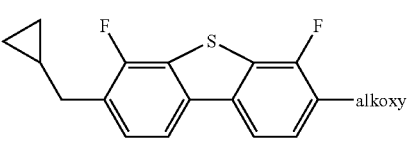
III17

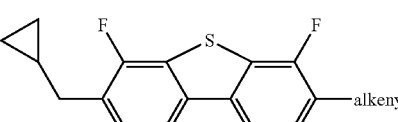
III18

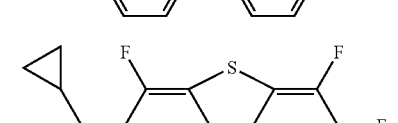
III19

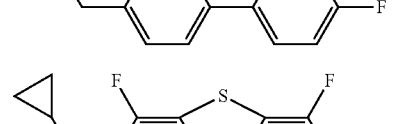
III20

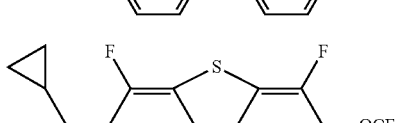
III21

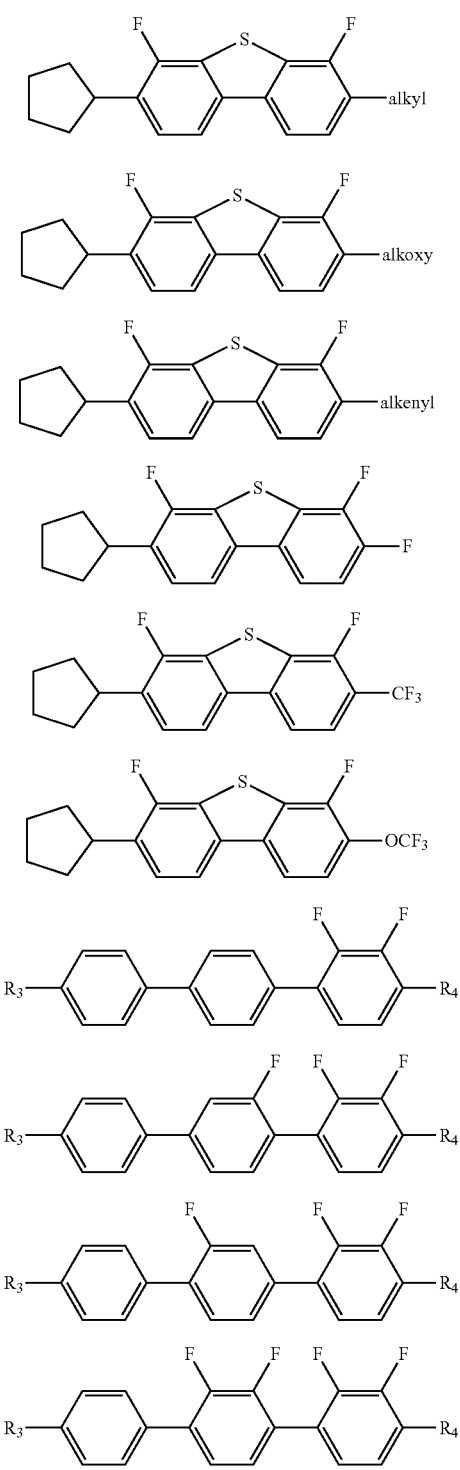

wherein alkyl, alkyl* each independently represents a linear alkyl group having a carbon atom number of 1-5;
alkoxy, alkoxy* each independently represents a linear alkoxy group having a carbon atom number of 1-5;
alkenyl, alkenyl* each independently represents an alkenyl group having a carbon atom number of 2-5;
$R_3$ each independently represents a linear alkyl group having a carbon atom number of 1-5, a linear alkoxy group having a carbon atom number of 1-5, an alkenyl group having a carbon atom number of 2-5,

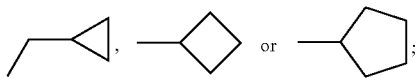

$R_4$ each independently represents a linear alkyl group having a carbon atom number of 1-5, a linear alkoxy group having a carbon atom number of 1-5 or an alkenyl group having a carbon atom number of 2-5.

4. The liquid crystal composition according to claim 1, wherein the liquid crystal composition further comprises at least two compounds selected from formulas VA, VB and VC,

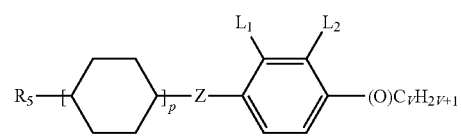

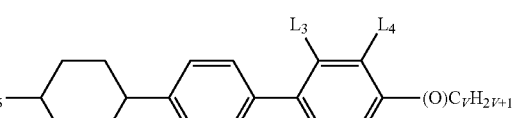

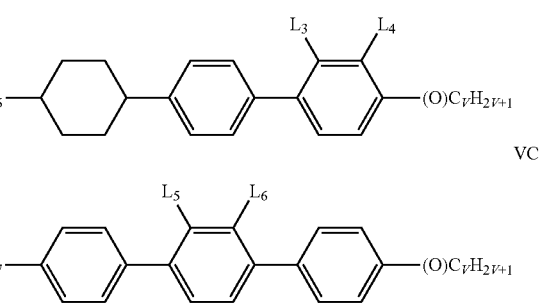

wherein $R_5$, $R_6$, $R_7$ each independently represents a linear alkyl group having a carbon atom number of 1-5, a linear alkoxy group having a carbon atom number of 1-5 or an alkenyl group having a carbon atom number of 2-5;
$L_1$-$L_6$ each independently represents H or F;
p represents 1 or 2;
v each independently represents an integer of 1-6;
Z represents a single bond, —CH$_2$CH$_2$—, —CH$_2$O—, —OCH$_2$—.

5. The liquid crystal composition according to claim 1, wherein the liquid crystal medium comprises two, three, four, five or six compounds of formulas VA, VB, VC.

6. The liquid crystal composition according to claim 4, wherein the proportion of the compounds of formulas VA, VB and/or VC in the entire mixture is at least 10% by weight.

7. The liquid crystal composition according to claim 1, wherein said liquid crystal medium comprises at least one polymerizable compound.

8. The liquid crystal composition according to claim 1, wherein said liquid crystal medium comprises at least one additive.

9. An optoelectronic display having active matrix addressing, wherein said optoelectronic display contains the liquid crystal composition of claim 1 as a dielectric substance.

10. The photoelectric display according to claim 9, wherein said photoelectric display is a VA, PSA, PA-VA, SS-VA, SA-VA, PS-VA, PALC, IPS, PS-IPS, FFS or PS-FFS display.

* * * * *